United States Patent [19]

Deegan et al.

[11] Patent Number: 6,055,632
[45] Date of Patent: Apr. 25, 2000

[54] METHOD AND APPARATUS FOR TRANSFERRING FIRMWARE TO A NON-VOLATILE MEMORY OF A PROGRAMMABLE CONTROLLER SYSTEM

[75] Inventors: Thomas J. Deegan, North Royalton; Frank D. Lucko, Lakewood, both of Ohio; Gary A. Turck, Menomonee Falls; Eric W. Hamber, New Berlin, both of Wis.

[73] Assignee: Allen-Bradley Company, LLC, Milwaukee, Wis.

[21] Appl. No.: 08/937,573

[22] Filed: Sep. 25, 1997

[51] Int. Cl.[7] .................................................. G06F 9/445
[52] U.S. Cl. .......................................... 713/100; 709/221
[58] Field of Search ..................................... 713/100–129, 713/2; 710/129, 9, 1; 364/146, 147, 136, 200; 395/275, 700; 714/29, 38; 712/15; 709/217, 218, 219, 220, 221, 222, 223; 380/49

[56] References Cited

U.S. PATENT DOCUMENTS

| | | | |
|---|---|---|---|
| 4,742,443 | 5/1988 | Rohn et al. | 364/136 |
| 5,142,680 | 8/1992 | Ottman et al. | 395/700 |
| 5,162,986 | 11/1992 | Graber et al. | 364/146 |
| 5,295,059 | 3/1994 | Brooks et al. | 364/147 |
| 5,307,463 | 4/1994 | Hyatt et al. | 395/275 |
| 5,608,884 | 3/1997 | Potter | 710/129 |
| 5,761,518 | 6/1998 | Boehling et al. | 710/1 |
| 5,845,149 | 12/1998 | Husted et al. | 710/9 |

Primary Examiner—Joseph E. Palys
Assistant Examiner—Rijue Mai
Attorney, Agent, or Firm—Craig N. Killen; John J. Horn; Alex M. Gerasimow

[57] ABSTRACT

A method of transferring firmware to a non-volatile memory of a programmable controller system comprises the steps of establishing a remote network connection and transferring the firmware to the non-volatile memory of the programmable controller system by way of the remote network connection. The remote network connection is established between a first computer system utilized by a firmware provider and the programmable controller system. The first computer system is located remotely from the programmable controller system. Alternatively, the remote network connection may also be established between the first computer system and a second computer system utilized by a user of the programmable controller system and located locally with the programmable controller system. Advantageously, using a network link, firmware upgrade can be downloaded into a processor module of a programmable controller system from a firmware provider, without any transportation delays and without any significant hardware intervention. Additionally, the network link also enables the computer to be networked to a plurality of processor modules at once, so that the firmware upgrade can be nearly simultaneously downloaded to the plurality of networked processor modules at once, without significant hardware intervention. Finally, in addition to being useful in conjunction with processor modules that have built-in communication ports, the present invention is also useful in conjunction with processor modules having a communication daughterboard.

24 Claims, 3 Drawing Sheets

METHOD AND APPARATUS FOR TRANSFERRING FIRMWARE TO A NON-VOLATILE MEMORY OF A PROGRAMMABLE CONTROLLER SYSTEM

BACKGROUND OF THE INVENTION

1. Field of the Invention

This invention relates to methods and systems for transferring firmware to a non-volatile memory, and in particular relates to methods and systems for transferring firmware to a non-volatile memory of a programmable controller system.

2. Description of the Related Art

Programmable controller systems are widely known for controlling industrial processes. A typical programmable controller system comprises a processor module and a plurality of other modules (e.g., I/O modules, scanner modules, and so on) disposed in a chassis and connected by way of a common backplane although other types of programmable controller systems also exist.

The processor module includes operating system firmware ("firmware"). Using the firmware, in conjunction with a user program specially adapted to a particular user's control needs, the processor module is able to perform a variety of tasks, including controlling a plurality of output devices in response to a plurality of input devices. The firmware is an image stored in non-volatile memory of the processor module. Periodically, it is necessary or desirable to upgrade this firmware in order to improve the performance of the programmable controller system.

A variety of different methods of upgrading the firmware of a processor module have been developed, all of which suffer common drawbacks. According to a first approach, a programming card is provided which contains the firmware upgrade in its memory. The processor module includes a connector which is adapted for receiving the programming card. When the programming card is plugged into the connector, a communication link is established between the programming card and the processor module, and the programming card downloads the firmware upgrade into the non-volatile memory.

The first drawback to this approach is that it is causes an undesirable transportation delay, i.e., a delay between (1) the point in time at which the programming card is ordered by the user and (2) the point in time at which the programming card is received by the user. The transportation delay is caused by the fact that the programming card is a physical unit which must be transported from the firmware provider to the user of the programmable controller system. The user and the firmware provider are often hundreds or even thousands of miles apart. Even if the programming card is sent via overnight mail, the user does not receive the programming card for about a day, assuming the firmware provider has a programming card available to send the user and can send the programming card immediately. Additionally, for reasons of security, the programming card is often sent to field service personnel instead of directly to the user, thereby further increasing the delay. These delays are often extremely expensive and inconvenient for the user, especially if the user has taken the programmable controller system out of operation pending the arrival of the firmware upgrade. In this regard, it should be noted that the usual reason for a user requesting the programming card for performing an upgrade is because the programmable controller system is not working as desired.

The second drawback to this approach is that it is hardware intensive. The processor module must be physically removed from the backplane and the programming card must be connected to the processor module. It would be preferable to minimize the extent to which intervention with the hardware aspects of the programmable controller system is required.

The third drawback to this approach is that it requires additional hardware, i.e., the programming card itself. The firmware provider must incur the additional cost of manufacturing the programming card for the purpose of performing the upgrade. Additionally, if the firmware provider does not have any programming cards available when the user requests an upgrade, then the user must wait an additional period of time before the upgrade can be performed.

According to a second approach, the firmware provider sends the user (or field service personnel) new non-volatile memory containing the firmware upgrade. To perform the firmware upgrade, the non-volatile memory which stores the firmware is physically removed (unplugged) from the processor module and replaced with new non-volatile memory containing the firmware upgrade.

This approach suffers the same drawbacks as the previous approach. Specifically, the fact that the firmware provider must send the user new non-volatile memory can cause a transportation delay which may be extremely expensive and inconvenient for the user. Additionally, this approach is hardware intensive. The processor module must be physically removed from the backplane and the non-volatile memory must be replaced. Again, it would be preferable to minimize the extent to which intervention with the hardware aspects of the programmable controller system is required.

Finally, according to a third approach, the firmware provider sends a floppy disk containing the firmware upgrade. To perform the firmware upgrade, the floppy disk is loaded into a personal computer and a local network link is established between the personal computer and the processor module. The link is established by way of a built-in communication port disposed on the processor module, i.e., a communication port which is physically disposed on the same circuit board and which is electrically connected to the address, data, and control buses of the processor module.

Again, this approach suffers the drawback that the firmware provider must send the user a floppy disk, and the resultant transportation delay may be extremely expensive and inconvenient for the user. Even if the upgrade is performed by field service personnel, who may have more immediate access to the firmware upgrade, the user is still required to wait for the field service personnel to arrive with the firmware upgrade.

Additionally, as a general rule (to which the above-mentioned type of processor modules are the exception), most processor modules do not have a built-in communication port. Therefore, this approach is not available for most processor modules.

Some processor modules have a physically separate daughterboard which includes a communication port linked to the processor module by a dual port RAM. The daughterboard is used for messaging with other programmable controller systems and for loading user programs (i.e., programs that run on top of the existing operating system firmware) into the processor module. However, in these processor modules, the firmware responsible for communicating through the dual port RAM is the same firmware as that which is upgraded. Thus, this firmware can not be used to transfer firmware through the dual port RAM during the firmware upgrade process.

SUMMARY OF THE INVENTION

In order to overcome these drawbacks, the present invention provides a method of transferring firmware to a non-volatile memory of a programmable controller system comprising the steps of establishing a remote network connection and transferring the firmware to the non-volatile memory of the programmable controller system by way of the remote network connection. The remote network connection is established between a first computer system utilized by a firmware provider and the programmable controller system. The first computer system is located remotely from the programmable controller system. Alternatively, the remote network connection may also be established between the first computer system and a second computer system utilized by a user of the programmable controller system and located locally with the programmable controller system.

The present invention can be used with processor modules which do not have a built-in communication port but which instead have, for example, a communication daughterboard. Accordingly, according to another embodiment of the invention, the method of upgrading firmware in a non-volatile memory of a processor module of a programmable controller system comprises the steps of transferring a firmware upgrade over a network, receiving the firmware upgrade at a communication daughterboard of the programmable controller system, and transferring the firmware upgrade from the communication daughterboard to non-volatile memory of the processor module. The firmware is adapted for being executed by the processor module as the processor module controls a plurality of output devices in response to a plurality of input devices.

The communication daughterboard is attached to the processor module. The communication daughterboard has address, data and control buses which are different than address, data and control buses of the processor module.

When the firmware upgrade is transferred from the communication daughterboard to non-volatile memory of the processor module, the firmware is transferred through a dual port volatile memory. This step includes transferring the firmware to a volatile memory, the volatile memory being disposed on a communication daughterboard, transferring the firmware from the volatile memory to the dual port volatile memory, and transferring the firmware from the dual port volatile memory to the non-volatile memory.

According to another embodiment, a programmable controller system comprises a computer system, a network, and a plurality of programmable controller modules. The plurality of programmable controller modules are networked to the computer system by way of the network. Each of the plurality of programmable controller modules is linked to the computer system by a separate network connection. The plurality of programmable controller modules receive firmware by way of the network from the computer system.

Advantageously, using a network link, firmware upgrade can be downloaded into a processor module of a programmable controller system from a firmware provider, without any transportation delays and without any significant hardware intervention. Additionally, the network link also enables the computer to be networked to a plurality of processor modules at once, so that the firmware upgrade can be nearly simultaneously downloaded to the plurality of networked processor modules at once, without significant hardware intervention. Finally, in addition to being useful in conjunction with processor modules having built-in communication ports, the present invention is also useful in conjunction with processor modules that have a communication port disposed on a communication daughterboard.

Other objects, features, and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many modifications and changes within the scope of the present invention may be made without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENTS

Figure 1:
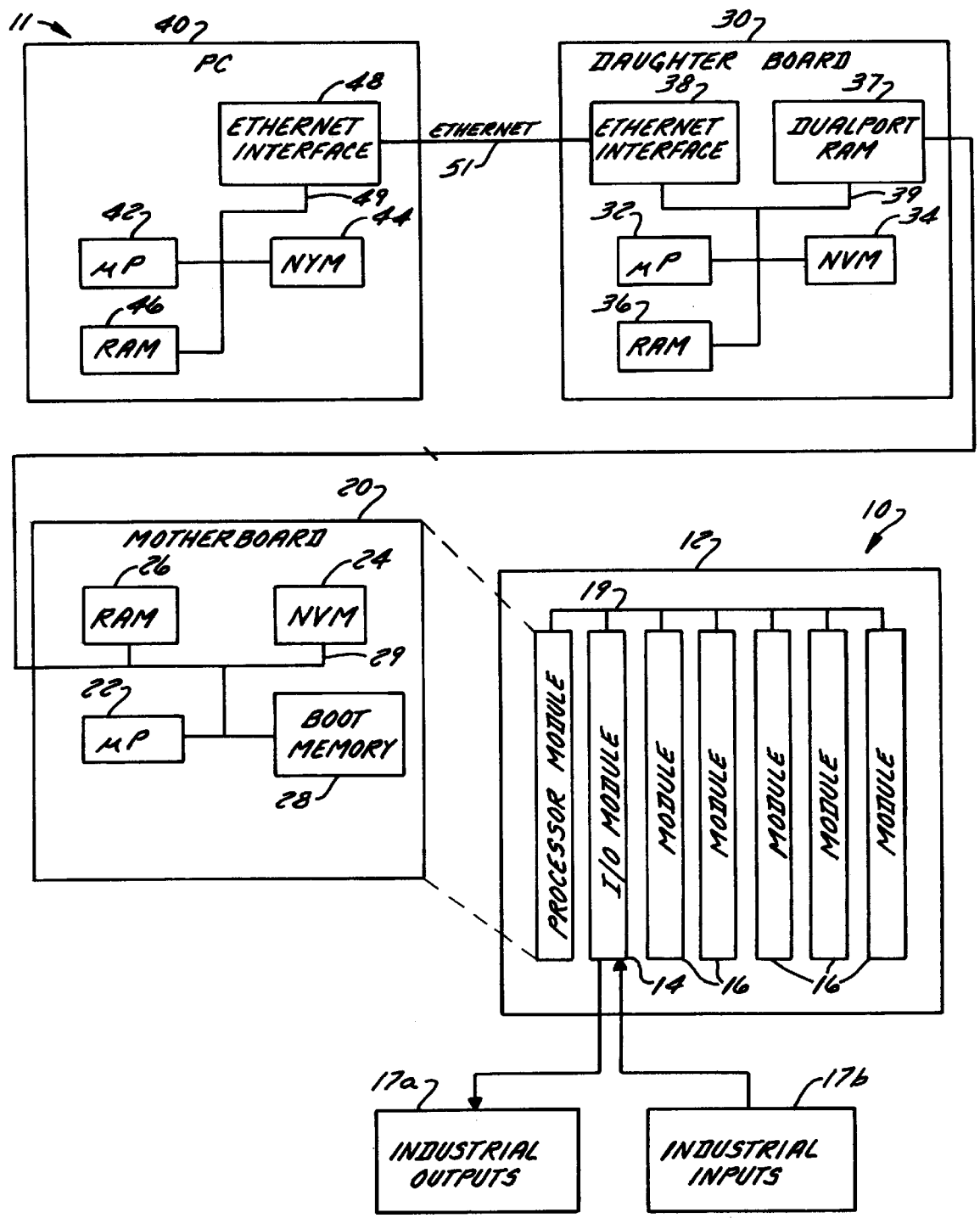
FIG. 1 is a simplified diagrammatic view of a programmable controller system which includes an embodiment of a non-volatile memory upgrade system according to the present invention.

Referring now to FIG. 1, a simplified diagrammatic view of a programmable controller system 10 which includes a firmware upgrade system 11 is illustrated. By way of overview, a personal computer (PC) 40 is connected to the programmable controller system 10 by way of a network link 51. The network link 51 enables the computer 40 to be remotely located, e.g., in the possession of the firmware provider in a different city. (Normally, the firmware provider is the manufacturer of the programmable controller system 10. However, the firmware provider could also be a different entity such as an independent vendor.) Using the network link 51, the firmware upgrade is downloaded into the processor module 20 of the programmable controller system 10 from a remote location, without any transportation delays and without any significant hardware intervention. Additionally, the network link 51 also enables the computer to be networked to a plurality of other processor modules, so that the firmware upgrade can also be nearly simultaneously downloaded to a plurality of networked processor modules at once, without significant hardware intervention. Finally, in addition to being useful in conjunction with processor modules having built-in communication ports, the present invention is also useful in conjunction with processor modules having a communication port disposed on a communication daughterboard, such as the processor module 20 described below.

More specifically, the programmable controller system 10 comprises a plurality of modules 14 and 16 disposed in a chassis 12 and connected by way of a common backplane 19. Included among the modules is the processor module 20, which executes firmware and acts through the module 14, which is an I/O module, to control the output states of a plurality of industrial output devices 17a in response input status information from to a plurality of industrial input devices 17b. The other modules 16 may also be I/O modules, or they may be other types of modules.

The processor module 20 comprises a microprocessor 22, a non-volatile memory (NVM) 24, a random access memory (RAM) 26, and a boot memory 28. The microprocessor 22, the non-volatile memory 24, the random access memory 26, and the boot memory 28 are connected to each other by way of a set of address, control and data buses 29.

The non-volatile memory 24 stores the firmware executed by the processor module 20, and it is the image in the non-volatile memory 24 that is upgraded by the firmware upgrade system 11. Typically, but not always, the firmware consumes all of the memory space of the non-volatile memory 24. Preferably, the non-volatile memory is flash memory. Also, although random access memory 26 is illustrated, any type of volatile memory could be used.

The boot memory 28 is also non-volatile memory, however, it is separate from the non-volatile memory 24. In addition to storing firmware necessary for booting up the processor module 20, the boot memory 28 also stores the firmware executed by the microprocessor 22 as the non-volatile memory 24 is being upgraded. This is because, with flash memory (for example) it is not possible to execute from the flash memory while simultaneously transferring a new image to the flash memory. For this reason, the firmware executed by the microprocessor 22 as the non-volatile memory 24 is being upgraded is stored in the boot memory 28, separately from the non-volatile memory 24.

The processor module 20 serves as a motherboard and is attached to the communication daughterboard 30. The processor module 20 and the communication daughterboard 30 utilize two separate circuit boards which are attached to each other through an appropriate mounting scheme.

The communication daughterboard 30 comprises a microprocessor 32, a non-volatile memory 34, a random access memory 36, a dual port RAM 37, and an Ethernet® interface 39. The microprocessor 32, the non-volatile memory 34, the random access memory 36, the dual port RAM 37 and the Ethernet interface 38 are connected to each other by way of a set of address, control and data buses 39. The set of buses 39 of the communication daughterboard 30 is distinct from the set of buses 29 of the processor module 20.

The memory space of the dual port RAM 37 is allocated differently depending on the mode of operation of the programmable controller system 10. During normal (non-upgrade) operation, one portion of the dual port RAM 37 is allocated to the processor module 20 and the other portion is allocated to the communication daughterboard 30. Normally, the address space occupied by the dual port RAM 37 need not be the same for the processor module 20 and the communication daughterboard 30 (i.e., each individual memory location can have two different addresses depending on which microprocessor accesses the memory location).

The Ethernet interface 38 includes an Ethernet port and imparts communication functionality to the daughterboard 30. (An Ethernet interface is preferred because of its high speed.) The Ethernet interface 38 establishes a network link 51 between the communication daughterboard 30 and the computer 40. The Ethernet interface 38 also connects the programmable controller system 10 with other programmable controller systems, and permits messages to be sent back and forth between them. The Ethernet interface 38 could also be used to upgrade the firmware of the communication daughterboard 30. In this case, the communication daughterboard 30 would also comprise a boot memory (not illustrated) similar to that of the processor module 20.

The computer 40 comprises a microprocessor 42, non-volatile memory 44, random access memory 46, and an Ethernet interface 48. In a preferred embodiment, the computer 40 is remotely located, e.g., in the possession of the firmware provider in a different city. This could be achieved, for example, by establishing an internet link as part of the link 51 which connects the computer 40 and the daughterboard 30. When the user of the programmable controller system 10 provides the firmware provider with he IP address of the programmable controller system 10, it becomes possible for the firmware provider to establish a direct link with the communication daughterboard 30 by way of the Ethernet interface 38. Advantageously, therefore, the firmware of the processor module 20 can be upgraded immediately after the user requests an upgrade (without any transportation delay), and can be upgraded with minimal hardware intervention.

Figure 2:
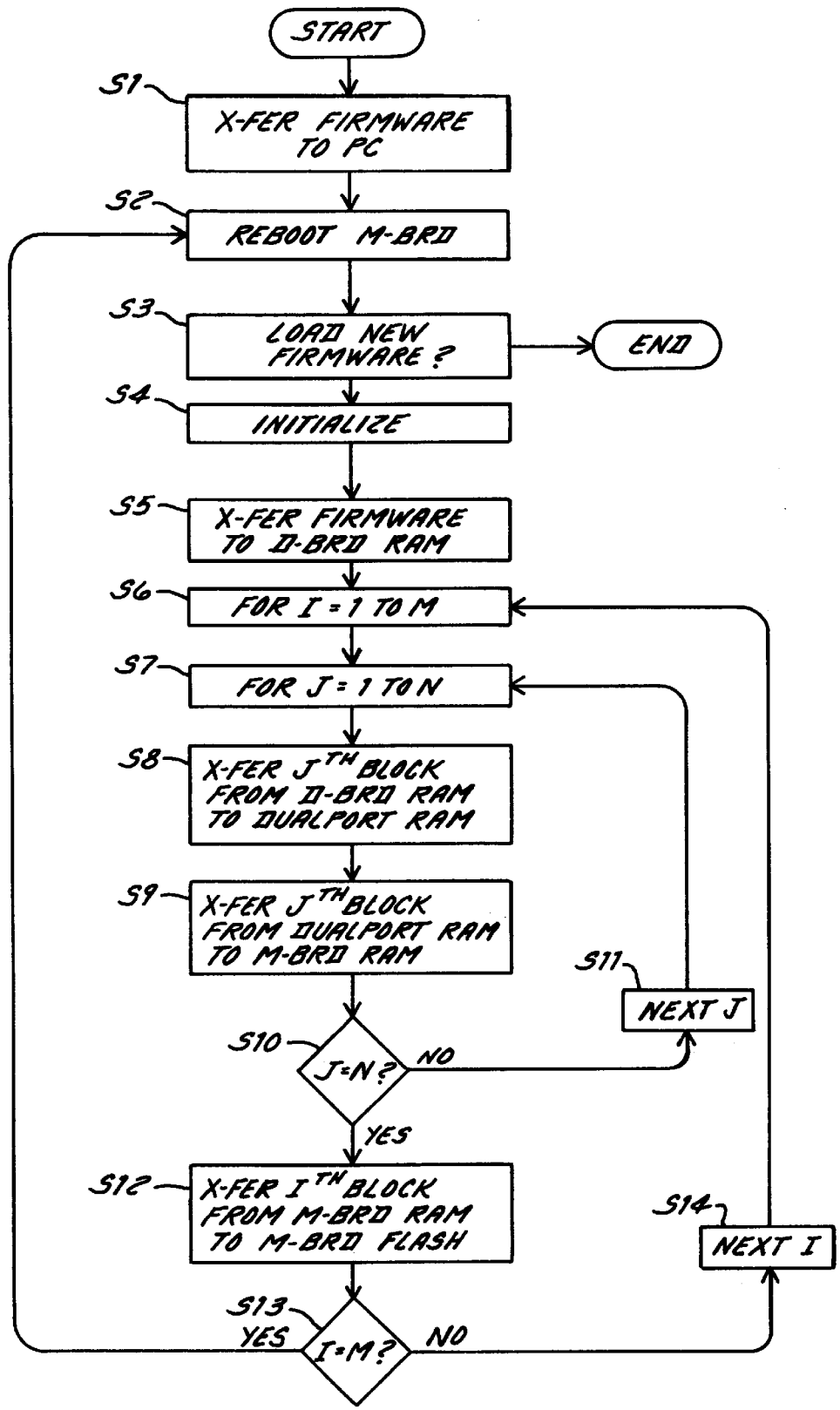
FIG. 2 is a flow chart of the steps used to upgrade the image stored in a non-volatile memory of a processor module according an embodiment of the present invention.

Referring now also to FIG. 2, a flow chart of the steps used to upgrade the firmware of a processor module 20 is illustrated. The process is especially adapted for use with a processor module that does not have a built-in communication port.

The first step S1 is to transfer an image (i.e., the firmware upgrade) to the computer 40. As previously noted, in one preferred embodiment, the computer 40 is in the possession of the firmware provider, who may already have the firmware revision loaded onto the computer 40. In this case, the firmware provider establishes a remote Ethernet link directly with the communication daughterboard 30, e.g., over the internet, and it is the firmware provider that conducts the firmware upgrade.

The step S1 could also be accomplished in other ways. For example, the firmware provider could make the firmware upgrade available on a website, and the user could access the website in order to download the firmware upgrade into the computer 40. In this case, the remote network connection is established between the computer 40 and a computer in the possession of the firmware provider.

At step S2, the processor module 20 is rebooted. As previously noted, the firmware execited during the firmware upgrade by the processor module 20 when the non-volatile memory 24 is being upgraded is stored in the boot memory 28. Rebooting the processor module 20 causes the processor module to start executing from this area of memory. It should also be noted that, when the firmware upgrade is transferred to the processor module 20, the processor module 20 must be temporarily taken out of service in order to avoid a safety hazard. Rebooting the processor module 20 also causes the processor module to be taken out of service for this reason.

At step S3, the processor module 20 determines whether to load new firmware. Step S3 occurs every time the processor module 20 boots up and, therefore, in most instances, the step S3 is answered negatively and the processor module 20 proceeds with normal boot/control operations.

When a firmware upgrade is to be performed, step S3 is answered affirmatively. An affirmative answer at step S3 can occur in a variety of ways. For example, the communication daughterboard 30 can signal the processor module 20 that a firmware upgrade is requested. The step S3 can then consist of testing for such a signal from the communication daughterboard 30 when the boot-up sequence is initiated. Alternatively, the processor module 20 could determine on its own that new firmware is required, for example, by determining that the firmware is non-existent (during production) or has been corrupted, or by determining that a hardware jumper has been set which indicates that the user wishes to perform a firmware upgrade.

At step S4 an initialization procedure occurs. As previously noted, the dual port RAM 37 is the only link between the communication daughterboard 30 and the processor module 20. Therefore, the relationship between the communication daughterboard 30 and the processor module 20 is a peer-to-peer relationship and not a master-slave relationship. Thus, no matter how it is initially decided that a firmware upgrade will be performed, both the communication daughterboard 30 and the processor module 20 must eventually agree to enter the special firmware upgrade mode (as embodied by steps S5–S14), as opposed to proceeding with normal control operations. This agreement process occurs during the initialization step S4.

The initialization step S4 also ensures that the communication daughterboard 30 indeed has a firmware upgrade available to transfer to the processor module 20. Conceivably, the firmware upgrade could be transferred to the communication daughterboard 30 ahead of time. Preferably, however, the firmware upgrade is transferred to the communication daughterboard after both the processor module 20 and the communication daughterboard 30 are rebooted. In this event, because the communication daughterboard 30 is rebooted, it is necessary to properly reconfigure the Ethernet interface 38 of the communication daughterboard 30 in order to perform the transfer.

This aspect of the initialization step S4 occurs as follows. Generally speaking, the Ethernet interface 38 may be configured automatically or manually. Normally, the Ethernet interface 38 is configured automatically (e.g., by way of a server) and the configuration information (e.g., an IP address) can be obtained at any time from the server. Often, however, the Ethernet interface is configured manually (e.g., by a separate computer connected through a separate serial port) and no such server is used. In this situation, there is a need to provide the communication daughterboard 30 with the Ethernet configuration information.

To meet this need, the configuration information which is generated when the Ethernet interface 38 is configured is stored in a retentive (battery backed up) area of RAM. When the processor module 20 reboots, and it is determined that an upgrade will be performed by way of the dual port RAM 37, the configuration information is accessed. If there is no configuration information, then it is assumed that the configuration information can be obtained from a server. Otherwise, the communication daughterboard 30 uses the stored configuration information to configure the Ethernet interface 38.

At step S5, the firmware upgrade is transferred from the computer 40 to the random access memory 36 of the communication daughterboard 30. The firmware upgrade is transferred from the computer 40 over the network link 51 to the communication daughterboard 30 and by way of the Ethernet interfaces 38 and 48.

The process (steps S6–S14) used to transfer the firmware upgrade from the communication daughterboard 30 to the processor module 20 by way of the dual port RAM 37 is now discussed. Initially, it should be noted that, because the processor module 20 does not have an operating system during the firmware upgrade, the functionality of the processor module 20 is extremely limited. During normal operation, the operating system provides a high level communication protocol that can be used to transfer program files and other information through the dual port RAM 37. However, since there is no operating system during the firmware upgrade, this protocol is not available during the firmware upgrade.

Instead, the protocol used is that which is defined by steps S6–S14. Advantageously, this protocol is relatively simple, and consists essentially of a series of low level, properly sequenced read and write operations to the dual port RAM 37. Since the ability to perform low level read and write operations still exists when the operating system is not available, the firmware upgrade may be performed even though the high level functionality provided by the operating system is not available. It should also be noted that this simplicity is facilitated by the fact that the parameters of the transfer (particularly, the size of the firmware upgrade) are known in advance and do not change with each upgrade.

By way of overview, during steps S6–S14, portions or blocks of the firmware upgrade are first transferred from the random access memory 36 of the communication daughterboard 30 to the dual port RAM 37, and then from the dual port RAM 37 to the random access memory 26 of the processor module 20. At the random access memory 26, the blocks accumulate until a given number of blocks have been received, at which time the blocks are transferred as one larger block to the non-volatile memory 24.

The firmware upgrade is broken down and reassembled in this manner due to the relative memory capacities of the dual port RAM 37, the random access memory 26 and the non-volatile memory 24. Specifically, in the exemplary embodiment, the available memory capacity of the dual port RAM 37 (16 K) is less than the available memory capacity of the random access memory 26 (128 K), and the available memory capacity of the random access memory 26 is less than the available memory capacity of the non-volatile memory 24 (512 K). (The total capacities of the memories 24, 26 and 37 may be greater, however, it is assumed herein that the total memory capacities of these devices is not available for use during the transfer process.) Therefore, the firmware upgrade must be subdivided and transferred in blocks.

Of course, it would be possible to use a dual port RAM 37 which is the same size as the firmware upgrade (or larger). However, given the relatively high cost of dual port memory, it is unlikely that such an approach would be taken, absent other reasons to do so.

Steps S6–S14 are now discussed in greater detail. Step S6 establishes an outer loop for the performance of steps S7–S14, and step S7 establishes an inner loop for the performance of steps S8–S11. During the inner loop, blocks are transferred from the random access memory 36 to the random access memory 26 by way of the dual port RAM 37. When enough blocks have been transferred such that the random access memory 26 is full (J=N), then the portion of the firmware upgrade contained in the random access memory 26 is burned into the non-volatile memory 24 using conventional non-volatile memory programming techniques. This process is repeated until the entire firmware upgrade has been burned into the non-volatile memory 24 (I=M). (In the exemplary embodiment, in which the memories 24, 26 and 37 have the available memory capacities given above, M=512 K. 128 K=4 and N=128÷16=8, where M is the total number of times the outer loop is repeated, and N is the number of times the inner loop is repeated for each repetition of the outer loop.)

After the firmware upgrade is complete, the process returns to step S3, where the processor module 20 reboots again. This time however, the decision at step S4 is answered negatively, and the processor module 20 proceeds with normal boot up operations.

Advantageously, therefore, it is possible to apply the present invention to processor modules of different configurations. For example, it is possible to apply the present invention to processor modules in which the Ethernet port (or other communication port) is not built-in, such as the processor module 20. In the case of the processor module 20, the link between the processor module 20 and the communication daughterboard 30 is a dual port RAM link having a relatively small memory capacity. Nevertheless, it is still possible to transfer the firmware upgrade to the non-volatile memory 24 by disassembling the firmware upgrade on one side of the dual port RAM 37 and reassembling it on the other side. Additionally, because the firmware used to perform this process is stored in the boot memory 28, it is possible to execute this firmware while upgrading the firmware of the non-volatile memory 24.

Figure 3:
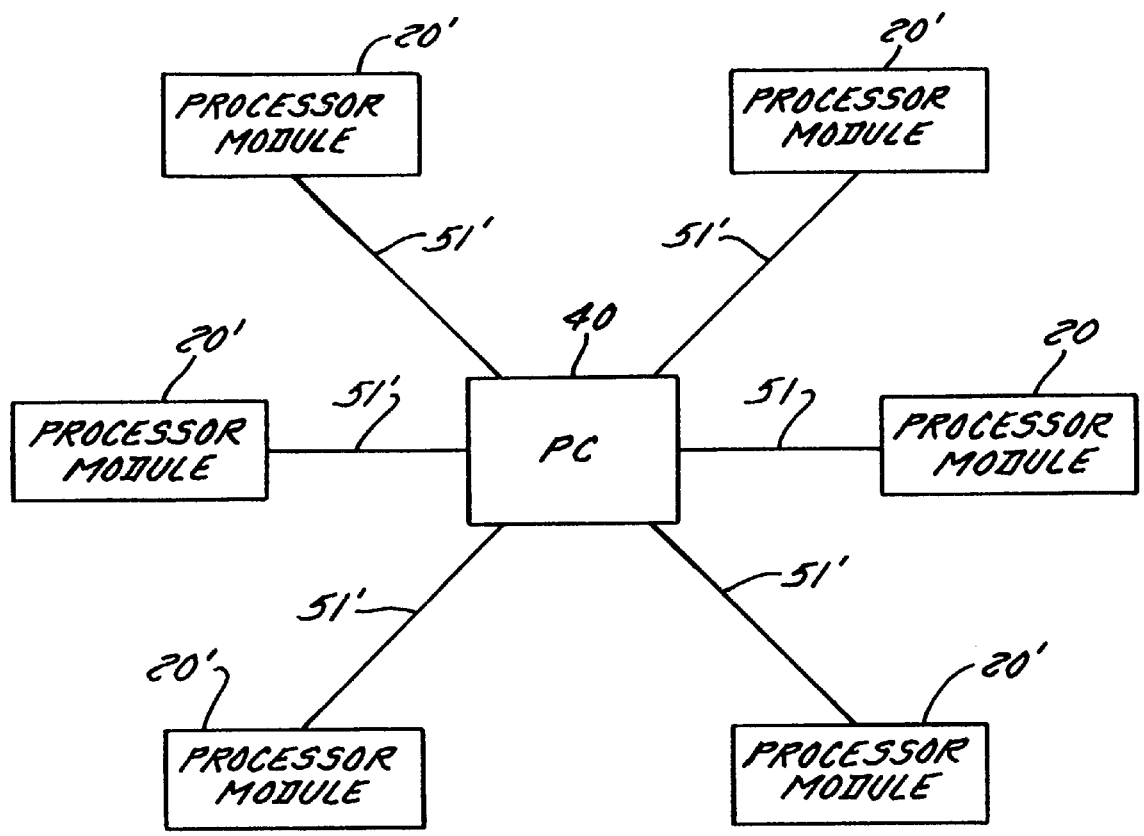
FIG. 3 is a simplified diagrammatic view of a plurality of networked processor modules which receive firmware according to an embodiment of the present invention.

Referring now to FIG. 3, a plurality of processor modules 20' are networked to a computer 40. The processor modules 20' each have a communication port, such as an Ethernet port, which allows the network connections to be established. Using the network links 51, the firmware upgrade can be transferred nearly simultaneously to all of the processor modules 20'.

Advantageously, therefore, it is possible to upgrade the firmware of a plurality of processor modules at once. For example, in a factory setting, the processor modules 20' may each be part of widely dispersed programmable controller systems. When a firmware upgrade is performed, the firmware upgrade can be performed from a central location within the factory (or from a remote location), without the need for hardware intervention and without even the need to individually visit each programmable controller system 10. Alternatively, the processor modules 20' could be disposed in a common rack, for example, during production. In this case, the system of FIG. 4 provides an easy way to transfer an initial version of firmware to a plurality of processor modules at once.

Many changes and modifications may be made to the present invention without departing from the spirit thereof. For example, the invention could also be applied in the context of soft programmable controller systems, which are another type of programmable controller system, and which comprise a general purpose computer specially programmed for controlling industrial processes. The scope of these and other changes will become apparent from the appended claims.

We claim:

1. A method of transferring operating system firmware to a non-volatile memory of a programmable controller system adapted to control an industrial process, the method comprising the steps of:

establishing a remote network connection between a first computer system utilized by a firmware provider and at least one of (1) said programmable controller system and (2) a second computer system utilized by a user of said programmable controller system and located locally with said programmable controller system, said first computer system being located remotely from said programmable controller system, and said remote network connection being an internet connection; and transferring said firmware to said non-volatile memory of said programmable controller system by way of said internet connection; and wherein said programmable controller system comprises a plurality of modules including a processor module and at least one module that connects the programmable controller system to a plurality of industrial input devices and a plurality of industrial output devices, wherein the plurality of modules are disposed in a chassis and connected by way of a common backplane, wherein said firmware is firmware for at least one of said plurality of modules, and wherein said processor module is adapted for controlling output states of said plurality of industrial output devices based on input status information from said plurality of industrial input devices.

2. A method according to claim 1, wherein said remote network connection is established between said first computer system and said programmable controller system, and wherein said firmware is transferred from said first computer system directly to said programmable controller system over said remote network connection.

3. A method according to claim 1, wherein said firmware is transferred to said second computer system, and wherein the method further comprising the steps of establishing a local network connection between said second computer system and said programmable controller system, and transferring said firmware from said second computer system to said programmable controller system over said local network connection.

4. A method according to claim 1, wherein said first computer system and said programmable controller system are separated by a distance that is on the order of hundreds of miles.

5. A method according to claim 1, wherein said first computer system and said programmable controller system are separated by a distance that is on the order of thousands of miles.

6. A method according to claim 1, wherein said first computer system and said programmable controller system are located in different cities.

7. A method of transferring operating system firmware to a non-volatile memory of a programmable controller system, the method comprising the steps of:

establishing a remote network connection between said programmable controller system and a computer system utilized by a firmware provider and located remotely from said programmable controller system; and transferring said firmware to said non-volatile memory of said programmable controller system by way of said remote network connection, including receiving said firmware at said programmable controller system by way of a communication daughterboard, said communication daughterboard being a daughterboard of a processor module of said programmable controller system, said processor module being adapted for executing said firmware while controlling a plurality of output devices in response to a plurality of input devices.

8. A method of transferring operating system firmware to a non-volatile memory of a programmable controller system, the method comprising the steps of:

establishing a remote network connection between a first computer system utilized by a firmware provider and a second computer system utilized by a user of said programmable controller system, said first computer system being located remotely from said programmable controller system and said second computer system being located locally with said programmable controller system;

establishing a local network connection between said second computer system and said programmable controller system;

transferring said firmware from said first computer system to said second computer system using said remote network connection;

transferring said firmware from said second computer system to said non-volatile memory of said programmable controller system using said local network connection;

establishing a plurality of additional local network connections between said second computer system and a plurality of processor modules; and transferring said firmware from said second computer system to a plurality of processor modules over said plurality of additional local network connections.

9. A method according to claim 8, wherein said remote network connection is an internet connection.

10. A method of transferring operating system firmware to a non-volatile memory of a processor module of a programmable controller system, the method comprising the steps of:

(A) establishing a remote network connection between a first computer system utilized by a firmware provider and at least one of (1) said programmable controller system and (2) a second computer system utilized by a user of said programmable controller system and located locally with said programmable controller system, said first computer system being located remotely from said programmable controller system; and (B) transferring said firmware to said non-volatile memory of said programmable controlled system by way of said remote network connection;

(1) transferring said firmware to a volatile memory, said volatile memory being disposed on a communication daughterboard, said communication daughterboard being attached to said processor module and having address, data and control buses which are different than address, data and control buses of said processor module;

(2) transferring said firmware from said volatile memory to a dual port volatile memory; and (3) transferring said firmware from said dual port volatile memory to said non-volatile memory; and wherein said firmware is adapted for being executed by said processor module as said processor module controls a plurality of output devices in response to a plurality of input devices.

11. A method according to claim 10, wherein said processor module includes a boot memory, wherein said transferring steps (1), (2) and (3) are initiated during a boot sequence of said processor module, and wherein firmware executed by said processor module to perform said transferring steps (1), (2) and (3) is stored in said boot memory.

12. A method according to claim 10, wherein said transferring step (2) includes the steps of subdividing said firmware into blocks and individually transferring said blocks through said dual port volatile memory.

13. A method according to claim 10, wherein said volatile memory is a first volatile memory, and wherein said transferring step (3) includes the steps of transferring said firmware from said dual port volatile memory to a second volatile memory and transferring said firmware from said second volatile memory to said non-volatile memory.

14. A programmable controller system comprising:
a computer system;
a network; and
a plurality of programmable controller modules, said plurality of programmable controller modules being networked to said computer system by way of said network, each of said plurality of programmable controller modules being linked to said computer system by a separate network connection, and said plurality of programmable controller modules receiving operating system firmware by way of said network from said computer system; and wherein said plurality of programmable controller modules are processor modules, wherein said firmware is adapted for being executed by said plurality of processor modules as said plurality of processor modules control a plurality of output devices in response to a plurality of input devices, wherein at least one of said plurality of processor modules is attached to a communication daughterboard, said daughterboard having a first set of address, data and control buses which are different than a second set of address, data and control buses of said at least one processor module, one of said at least one processor module and said daughterboard having disposed thereon a dual port volatile memory, said dual port volatile memory being connected to both said first set of buses and said second set of buses, and said dual port volatile memory transferring said firmware from said daughterboard to said processor module.

15. A system according to claim 14, wherein said at least one processor module further comprises a boot memory, said boot memory containing firmware executed by said at least one processor module when said at least one processor module boots up, and said boot memory containing firmware executed by said at least one processor module as said firmware is transferred from said daughterboard to said processor module.

16. A system according to claim 14, wherein said plurality of programmable controller modules are processor modules, and wherein said firmware is adapted for being executed by said processor modules as said processor modules control a plurality of output devices in response to a plurality of input devices.

17. A method of upgrading operating system firmware in a non-volatile memory of a processor module of a programmable controller system, the method comprising the steps of:

(A) transferring a firmware upgrade over a network;

(B) receiving said firmware upgrade at a communication daughterboard of said programmable controller system, said communication daughterboard being attached to said processor module and having address, data and control buses which are different than address, data and control buses of said processor module;

(C) transferring said firmware upgrade from said communication daughterboard to non-volatile memory of said processor module, said firmware being transferred through a dual port volatile memory, said firmware being adapted for being executed by said processor module as said processor module controls a plurality of output devices in response to a plurality of input devices, said transferring step (C) including the steps of (1) transferring said firmware to a volatile memory, said volatile memory being disposed on a communication daughterboard, (2) transferring said firmware from said volatile memory to said dual port volatile memory; and (3) transfixing said firmware from said dual port volatile memory to said non-volatile memory.

18. A method according to claim 17, wherein said firmware upgrade is transferred from a firmware provider remotely located with respect to said programmable controller system.

19. A method according to claim 18, wherein said communication daughterboard is connected to said network and receives said firmware upgrade directly from said firmware provider over said network.

20. A method according to claim 18, wherein said communication daughterboard is connected to a computer which is connected to said network, and wherein said communication daughterboard receives said firmware upgrade from said firmware provider over said network by way of said computer.

21. A method of transferring operating system firmware to a non-volatile memory of a programmable controller system adapted to control an industrial process, the method comprising the steps of:

establishing a remote network connection between a first computer system utilized by a firmware provider and at least one of (1) said programmable controller system and (2) a second computer system utilized by a user of said programmable controller system and located locally with said programmable controller system, said first computer system being located remotely from said programmable controller system, and said remote network connection being an internet connection; and transferring said firmware to said non-volatile memory of said programmable controller system by way of said internet connection; and wherein said programmable controller system is adapted for controlling output states of a plurality of industrial output devices based on input status information from a plurality of industrial input devices.

22. A method according to claim 21, wherein said first computer system and said programmable controller system are separated by a distance that is on the order of hundreds of miles.

23. A method according to claim 21, wherein said first computer system and said programmable controller system are located in different cities.

24. A method according to claim 21, wherein said non-volatile memory is a memory of said processor module.

* * * * *